US007129486B2

(12) United States Patent
Spizig et al.

(10) Patent No.: US 7,129,486 B2
(45) Date of Patent: Oct. 31, 2006

(54) SCANNING PROBE WITH DIGITIZED PULSED-FORCE MODE OPERATION AND REAL-TIME EVALUATION

(75) Inventors: Peter Spizig, Niederstotzingen (DE); Detlef Sanchen, Neu-Ulm (DE); Jörg Förstner, Ulm (DE); Joachim Koenen, Ulm (DE); Othmar Marti, Ulm (DE)

(73) Assignee: Witec Wissenschaftliche Instrumente und Technologie GmbH, Ulm (DE)

( * ) Notice: Subject to any disclaimer, the term of this patent is extended or adjusted under 35 U.S.C. 154(b) by 0 days.

(21) Appl. No.: 10/433,917

(22) PCT Filed: Dec. 12, 2001

(86) PCT No.: PCT/EP01/14593

§ 371 (c)(1),
(2), (4) Date: Dec. 1, 2003

(87) PCT Pub. No.: WO02/48644

PCT Pub. Date: Jun. 20, 2002

(65) Prior Publication Data

US 2004/0084618 A1    May 6, 2004

(30) Foreign Application Priority Data

Dec. 13, 2000 (DE) ................. 100 62 049

(51) Int. Cl.
*G01N 23/00* (2006.01)
(52) U.S. Cl. .................... 250/311; 250/307
(58) Field of Classification Search ........... 250/311, 250/307, 308; 73/105
See application file for complete search history.

(56) References Cited

U.S. PATENT DOCUMENTS 5,224,376 A    7/1993    Elings et al. ............ 73/105

(Continued)

FOREIGN PATENT DOCUMENTS

DE    44 37 081    3/1997

(Continued)

OTHER PUBLICATIONS

Krotil, H. et al.: "Pulsed Force Mode: a New Method for the Investigation of Surface Properties", Surface and Interface Analysis, 1999, pp., 336-340.

(Continued)

*Primary Examiner*—Nikita Wells
*Assistant Examiner*—Anthony Quash
(74) *Attorney, Agent, or Firm*—Baker & Daniels

(57) ABSTRACT

The invention relates to a method for creating the image of a sample surface to be analyzed, with a resolution which is better than 1 µm laterally in relation to the sample surface and better than 100 nm vertically in relation to said surface. According to the invention, the surface is scanned on a point-by-point basis by a scanning probe, the distance between the scanning probe and the sample surface at each scanning point being periodically modulated, in such a way that a force-time curve of the probe is produced for this point. The force-time curve is recorded at each scanning point, digitized using an A/D converter, evaluated online in real-time and stored, together with the entire data stream, in a first area of a memory device. One or several characteristic variables of the force-time curves are determined for each scanning point from the real-time evaluation results and the stored digitized force-time curves and an image of the sample surface is obtained from said characteristic variables of the scanning points.

12 Claims, 2 Drawing Sheets

U.S. PATENT DOCUMENTS

| | | | | |
|---|---|---|---|---|
| 5,412,980 | A | 5/1995 | Elings et al. | 73/105 |
| 5,477,732 | A | 12/1995 | Yasue et al. | 73/105 |
| 5,519,212 | A | 5/1996 | Elings et al. | 250/234 |
| 5,805,448 | A | 9/1998 | Lindsay et al. | 364/176 |
| 6,880,386 | B1 * | 4/2005 | Krotil et al. | 73/105 |

FOREIGN PATENT DOCUMENTS

| | | |
|---|---|---|
| DE | 197 28 357 | 1/1999 |
| DE | 199 00 114 | 8/2000 |

OTHER PUBLICATIONS

Marti, O. et al., "Control Electronics for Atomic Force Microscopy", 1988 American Institute of Physics, Review of Scientific Instruments, Jun. 1988, No. 6, New York, NY.

Dror Sarid, et al., "Driven nonlinear atomic force microscopy cantilevers: From noncontact to tapping modes of operation", J. Vac. Sci. Technol. B 14(2), (1996), pp. 864-867.

Dr. Paul Profos, et al., "Handbuch der industriellen Meβtechnik", vol. 5, (1992), pp. 205-206.

O. Marti, et al., "Reibungsmikroskopie", Phys. Bl. 48 (1992) Nr. 12, pp. 1007-1009.

A. Rosa, et al., "The simultaneous measurement of elastic, electrostatic and adhesive properties by scanning force microscopy: pulse-force mode operation", Meas. Sci. Technol. 8 (1997) pp. 1-6.

P. Maivald, et al., "Using force modulation to image surface elasticities with the atomic force microscope", Nanotechnology 2 (1991), pp. 103-106.

Manfred Radmacher, et al., "Imaging Adhesion Forces and Elasticity of Lysozyme Adsorbed on Mica with the Atomatic Force Microscope", Langmuir, vol. 10, No. 10 (1994), pp. 3809-3814.

Joachim P. Spatz, et al., "Forces affecting the substrate in resonant tapping force microscopy", Nanotechnology 6 (1995), pp. 40-44.

Y. Martin, et al., "Atomic force microscope-force mapping and profiling on a sub 100-Å scale", J. Appl. Phys., vol. 61, No. 10, (1987), pp. 4723-4729.

Manfred Radmacher, et al., "Mapping Interaction Forces with the Atomic Force Microscope", Biophysical Journal, vol. 66, (1994), pp. 2159-2165.

H.A. Mizes, et al., "Submicron probe of polymer adhesion with atomic force microscopy: Dependence on topography and material inhomogeneties", Appl. Phys. Lett., vol. 59, No. 22, (1991), pp. 2901-2903.

Kees O. van der Werf, et al., "Adhesion force imaging in air and liquid by adhesion mode atomic force microscopy", Appl. Phys. Lett., vol. 65, No. 9, (1994), pp. 1195-1197.

* cited by examiner

US 7,129,486 B2

SCANNING PROBE WITH DIGITIZED PULSED-FORCE MODE OPERATION AND REAL-TIME EVALUATION

BACKGROUND OF THE INVENTION

Prior Art

The invention relates to a method for producing the image of a surface of a specimen to be examined with a resolution which is better than 1 pm laterally to the surface and better than 100 nm perpendicularly to the surface, with a scanning probe scanning the surface point by point and the distance between the scanning probe and the specimen surface being modulated at each scanning point, thus leading to a force-time curve. The invention also provides a scanning probe microscope for performing such a method.

A large number of methods for imaging the surfaces of specimen pieces by means of scanning probes have already been described in the state of the art.

One possibility for examining a specimen surface and for producing a surface image by means of a scanning probe is that the scanning probe is brought into contact with the surface of the specimen and the surface of the specimen is then scanned. Such an imaging method is known as "contact-mode" and is used for example for determining the topography and the local friction. With respect to the "contact-mode method", reference is hereby made to the following publications:

Maivald P, Butt H-J, Gould S A C, Prater C B, Drake B, Gurley J A, Elings V B and Hansma P K (1991), Using force modulation to image surface elasticities with the atomic force microscope, Nanotechnology, 2, 103–105, and Marti 0 and Colchero J, 1992, "Reibungsmikroskopie" (Frictional Microscopy), "Phys. Rafter" 48, 107, the disclosure of which shall be fully included in the present application.

The disadvantage of this imaging method is that when moving the scanning probe which is in contact with the surface of the specimen piece, shearing forces will occur which deform the surface of soft specimens such as polymeric or biological systems or can even destroy the same.

In order to protect a surface from deformation or destruction it is advantageous to examine the specimen surface with the help of a method in which the scanning probe is not in contact with the same. This method is generally known in literature as "non-contact mode". It is a method with which a destruction of the specimen surface can be excluded entirely. One disadvantage of this method is however that the resolution decreases with increasing distance between scanning probe and specimen surface and no mechanical specimen properties can be examined.

Reference is hereby made with respect to the "non-contact mode", the disclosure of which is hereby fully included in the present application:

Martin Y, Williams C C and Wickramsinghe H G, (1987), Atomic force microscope-force mapping and profiling on a sub 100-A scale, J. App. Phys., 61, 4723;

Sarid D, Ruskell T G, Workman R K and Chen D, 1996, J. Vac. Sci. Technol. B, 14, 864–7.

A method which allows the examination of soft specimen surfaces such as those of polymers but which on the other hand still offers sufficient information on the specimen surface is the so-called "intermediate-contact-mode" method, in which a scanning probe can be made to oscillate close to its natural frequency. The oscillating scanning probe is moved towards the specimen until it touches the specimen surface. The phase shift between the free oscillation in air and the oscillation when the scanning probe approaches the surface depends on the elastic-viscous properties of the probe and the adhesive potential between specimen and scanning probe. In this way it is possible to determine the elastic properties.

Reference is hereby made with respect to the "intermediate-contact-mode" method to the following:

Spatz J, Sheiko S, -Moller M, Winkler R, Reineker P and Marti 0, (1995), Forces affecting the substrate in the resonant tapping force microscopy, Nanotechnology, 6, 40–44

Digital Instruments, Incorporated, U.S. Pat. No. 5,412, 980 (1995), Tapping atomic force microscope Digital Instruments, Incorporated, U.S. Pat. No. 5,519, 212 (1996), Tapping atomic force microscope with phase or frequency detection, whose disclosure is hereby fully included in the present application.

The "intermediate-contact-mode" method comes with the disadvantage that the two variables, amplitude and phase shift, depend on a plurality of variables, so that a simple allocation to a physical variable is not possible.

These disadvantages can be overcome in such a way that the entire force-path or force-time curve is absorbed when the scanning probe approaches the specimen surface. This curve comprises the entire information of the interaction forces between scanning probe and specimen and allows a precise definition of the elastic-viscous properties and the adhesive forces.

Concerning this method reference is hereby made to:

Radmacher M, Cleveland J P, Fritz M, Hansma H G and Hansma P K, (1994) Mapping interaction forces with the atomic force microscope, Biophys. J, 66, 2159–65;

Radmacher M, Fritz M, Cleveland J P, Walters D A and Hansma P K, (1994 Imaging adhesion forces and elasticity of lysozyme adsorbed on mica with the atomic force microscope, Langmuir 10, 3809–14;

Van der Werf K O, Putman C A J, Groth B G and Greve J (1994), Adhesion force imaging in air and liquid by adhesion mode atomic force microscopy, Appl. Phys. Left, 65, 1195–7;

Mizes H A, Loh K-G, Miller R J D, Ahujy S K and Grabowskie E F (1991), Submicron probe of polymer adhesion with atomic force microscopy; dependence on topography and material inhomogeneities, Appl. Phys. Lett. 59, 2901–3 whose disclosure is hereby fully included in the present application.

The disadvantageous aspect in this method is that the scanning speed for recording an image is very low.

In order to increase this speed a new method was developed, the so-called "pulsed-force-mode" microscopy. In "pulsed-force-mode" (PFM) microscopy, the scanning probe is made to oscillate periodically in the z direction, i.e. the perpendicular direction relative to the specimen surface, and the force-time curve, which is an image of the force-path curve, is recorded and certain parameters of this force-time curve are evaluated with the help of analog circuits such as trigger circuits in order to obtain an image of the specimen surface.

Concerning the "pulsed-force-mode" microscopy reference is hereby made to:

Rosa A, Weiland E, Hild S and Marti O, The simultaneous measurement of elastic, electrostatic and adhesive properties by scanning force microscopy; "pulsed-forcemode-operation". Meas. Sci. Technol. 8, (1997), 1–6 whose disclosure is fully included in the present application.

The disadvantageous aspect in the imaging method of a specimen with the help of the "pulsed-force" microscopy as has become known from the state of the art, e.g. through the above document, is that triggers need to be placed for processing the analog signals. Since the evaluation of the pulsed-force curve is substantially limited to the time of the occurrence of the triggers, this leads to inaccuracies and optimal signals can only be obtained with difficulty.

Moreover, the setting of the triggers requires skilled staff and is very time-consuming.

A further disadvantage in the "pulsed-force" microscopy according to the current state of the art is that the possibilities for evaluating the force curves is very limited and thus remain inaccurate. As a result, it is possible to obtain quantitative measured values which are relevant from a viewpoint of material sciences only with much difficulty.

Moreover, the method is limited to a maximum of two variables which can be evaluated per measurement made with scanning microscopy, which is often inadequate.

SUMMARY OF THE INVENTION

It is thus the object of the present invention to provide an imaging method for an apparatus comprising a scanning probe which allows on the one hand recording a plurality of physical properties both quantitatively as well as qualitatively during a measurement made with a scanning microscope and provides on the other hand an image in a short period of time and with sufficient precision.

The invention shall also enable for the first time more complex variables such as constant maximum force (by taking into account measurement artifacts produced by interference or long-range forces for example), constant energy supply, constant penetration depth, etc. or combinations of such variables for control. The change between different control parameters should be possible. In order to make all parameters contained in the force-time curves accessible for the measurement and to increase the measurement precision in a number of material parameters, the invention shall further allow an active control of signal shape, phase, frequency and amplitude of the modulation signal.

This object is achieved in accordance with the invention in such a way that the force-time curve recorded with the help of the pulsed-force mode is digitized at each scanning point and is subjected to a realtime evaluation with the help of digital signal processing and programmable logic with a time interval shorter than the period. Moreover, in a preferable embodiment the data stream can be forwarded to a further computer unit for online evaluation and for storage for post-processing purposes.

In the present application the following shall apply:

Realtime evaluation shall be understood as being an evaluation of a digital data stream and the provision of the result(s) within a fixedly predetermined time interval. If the result of the evaluation is to be used as an actual value for a controller, such a realtime evaluation shall be necessary in order to minimize the controller deviations.

Online evaluation shall be understood as being an evaluation of a data stream occurring parallel to the data stream without the necessity of providing a result within a predetermined time interval. This is advantageous when one wishes to make a statement on the success of the measurement already during a measurement. In this case, a processing of the measured data that occurs in parallel is necessary.

Post-processing shall be understood in the present application as an evaluation of a data stream previously stored on a data storage medium such as a harddisk of a computer without any restrictions concerning the time requirements.

The digitization of the force-time curve and the evaluation by means of programmable logic allows determining from the force-time curve one or several characteristic variables of the force-time curve both in realtime as well as online according to control necessities as well as within the scope of post-processing for each scanning point according to definition. It is then possible to build up images of the properties of the specimen surface from said characteristic variables. By including the entire curve in the evaluation instead of individual curve points it is possible, in addition to building up an image with the help of characteristic variables, to also use them for deriving certain quantitative physical properties.

The active production and control of the modulation signal in the invention, which is in contrast to the classical pulsed-force method, allows influencing the modulation curve shape, phase, amplitude and frequency, either interactively during the measurement or automatically controlled by control parameters.

As a result, a plurality of methods become applicable by the invention for the evaluation of the force-distance curves, which methods allow, in contrast to previous measuring methods, detecting and distinguishing between a large variety of specimen parameters within a single measurement such as viscous, adhesive and elastic behavior. Since the force-distance curves are present in a completely digital form at the end of a measurement and thus can also optionally be subjected to a time-consuming post-processing process, the stored data are also available for subsequent clarification of measurement artifacts. At the same time, online evaluation allows a momentary success check at the time of measurement. In comparison with the "pulsed-force" microscopy according to the previously cited state of the art, more comprehensive evaluation methods can be used.

The possibility appears to be advantageous in that the number of variables used for the control and otherwise is no longer subjected to any limitations and the change from one evaluation method to another only needs to be made by software and no longer by the exchange of hardware as in the state of the art.

Especially preferably, the frequency of the periodic movement of the scanning probe is 1 Hz to 20 kHz in the direction perpendicular to the specimen surface and the amplitude is in the region of 10 to 500 nm. Advantageously, sinusoidal or sinus-like excitations are chosen. Other excitations such as saw-tooth-like or trapezoid can also be advantageous. An analysis of the actual movement of the scanning probe allows modifying or changing the shape of the excitation in such a way that the probe performs the desired periodic movement.

The starting point for the image build-up is the determination of the zero line as a characteristic variable. The zero line can vary from point to point due to far-reaching electrostatic forces. The zero line can be determined from the force value of the force-time curve which is obtained when the scanning probe is close to the specimen surface, but is not yet in contact with the same.

All further characteristic variables are obtained from the force-time curve by taking into account this base or zero line.

In a first embodiment of the invention it can be provided that the maximum repulsive force value is determined as a further characteristic variable from the digitized force-time curve which is obtained while the scanning probe is in contact with the surface.

It is provided for in a further embodiment of the invention that the difference between a point in the rising or falling branch of the force-time curve to the maximum force is designated as a characteristic variable. This difference is then a quantifiable measure for the local stiffness of the specimen and offers a stiffness image of the surface when entered on the scanned region.

In a further embodiment of the invention it can be provided that the minimum attractive force value on detaching the tip from the specimen surface is determined as a characteristic variable from the force-time curve. This characteristic variable is a quantifiable measure for the local adhesion of the specimen and leads to an adhesion image of the surface when it is entered over the scanned region.

The minimum force value when snapping the specimen probe onto the specimen surface can be determined as a further characteristic variable from the digitized force-time curve. Said minimum force value is a quantifiable measure for the local attraction of the specimen. If this characteristic variable is entered over the scanned region, an attraction image of the specimen can be obtained.

Stiffness images of the specimen can also be determined in another manner from the recorded force-time curve. In a first embodiment, a stiffness image is obtained in such a way that the slope of the force-time curve at a certain time when pressing the specimen probe into the specimen surface is determined as a characteristic variable. This slope is a quantifiable measure for the local stiffness of the specimen.

As an alternative to this, the slope can be determined at a specific relative time of the force-time curve when the specimen probe is pulled away from the specimen. This slope is also a quantifiable measure for the local stiffness of the probe and leads to a stiffness image of the same when entered over the scanned region.

It may be provided for in a further embodiment of the invention that the frequency of the free oscillation of the cantilever is detected as the characteristic variable. This is a quantifiable measure for the collected impurities or damage to the tip.

The ratio between the minimum force value when detaching from the specimen surface and the measured force value on the first following local force maximum can be determined as a further characteristic variable. This characteristic variable is a quantifiable measure for the energy dissipation when detaching the tip from the specimen.

When one determines from the force-time curve the rise time from the beginning of the contact up to the maximum force, it is possible to generate a rise time image of the specimen surface. It is analogously possible to obtain a fall time image of the specimen surface by determining the fall time from the digitized force-time curve.

In a further development of the invention it may be provided that the time of the repulsive contact between specimen and tip or the time of contact between specimen and tip is determined from the digitized force-time curve which is also recorded. When entered over the scanned region, these times lead to a repulsive contact image or a contact time image of the specimen surface.

Similar to the contact periods in the repulsive region of the force curve, contact periods for the adhesive portion of the force curve, e.g. from the force minimum to the zero crossing of the force curve, can be determined in a further development of the invention.

When entered on the scanned region, these periods lead to a contact-breaking period image of the specimen surface.

In addition to the direct evaluation of the force-time curve, it is possible to determine various integrals under the force-time curve as characteristic variables. For example, it is possible on the basis of the digitized curve to determine the integral under the force-time curve in the region of the repulsive contact or from the beginning of the contact until reaching the maximum force and from reaching the maximum force until the zero crossing of the force. When entered over the scanned region, these integral values offer a repulsive contact integral image of the specimen; in the case of the integral from the beginning of the contact until reaching the maximum force, an image of the work provided on the specimen and in the case of the integral from the time of reaching the maximum force until the zero crossing, an image of the work provided by the specimen.

Similar to the integrals in the repulsive region, integrals for the adhesive region of the force curve can also be determined from the digitized force-time curves.

It is possible for example to determine the surface area under the force curve from the time of minimum force up to the time of zero crossing of the force curve.

This integral is a measure for the local elastic-viscous properties of the specimen.

When calculating the difference of the integrals in the region of the repulsive contact and the integral under the force-time curve from the beginning of the contact until reaching the maximum force, an image can be produced of the work dissipated in the specimen.

It is particularly advantageous when the characteristic variables determined from the force-time curve are stored in a second memory area by allocating the various measuring and scanning points.

As a result of realtime evaluation, the invention allows obtaining a statement very rapidly for the very first time as to whether or not the momentarily performed measurement is occurring successfully because the digitized force-time curve which is evaluated in realtime is available to the user either immediately, i.e. during the running measurement as an electric signal which can be tapped externally from the device and can thus be read in by any kind of AFM controller, or visualized by the control computer.

In addition to the method in accordance with the invention, the invention also provides an apparatus for performing the method, with the scanning probe microscope for performing the method being characterized in that the apparatus comprises an analog-to-digital converter in order to digitize the recorded force-time curve and in order to enable the determination of predetermined characteristic variables from the digitized force-time curve in realtime.

One or several of the obtained realtime evaluation results can be used as a control signal for tracking the scanning probe on the specimen topography or for controlling the modulation signal. Preferably, the difference between the maximum repulsive force value and the force value obtained when the scanning probe is close to but not in contact with the specimen is used as the control signal for tracking the scanning probe on the specimen topography. It is advantageously also possible to use other variables.

If the digitized force-time curves are stored in a memory area, certain variables of the force-time curve can be determined by post-processing.

The oscillating movement of the scanning probe perpendicular to the specimen surface is excited with the help of a piezoelectric element.

Furthermore, it is provided for in a first embodiment that the scanning probe comprises a tip arranged on a beam and the means for recording the force-time curve comprise means for measuring the beam deflection, e.g. with the help of the deflection of a laser beam.

BRIEF DESCRIPTION OF THE DRAWING

The invention is to be described below by way of examples shown in the drawings, wherein.

DETAILED DESCRIPTION

Figure 1:
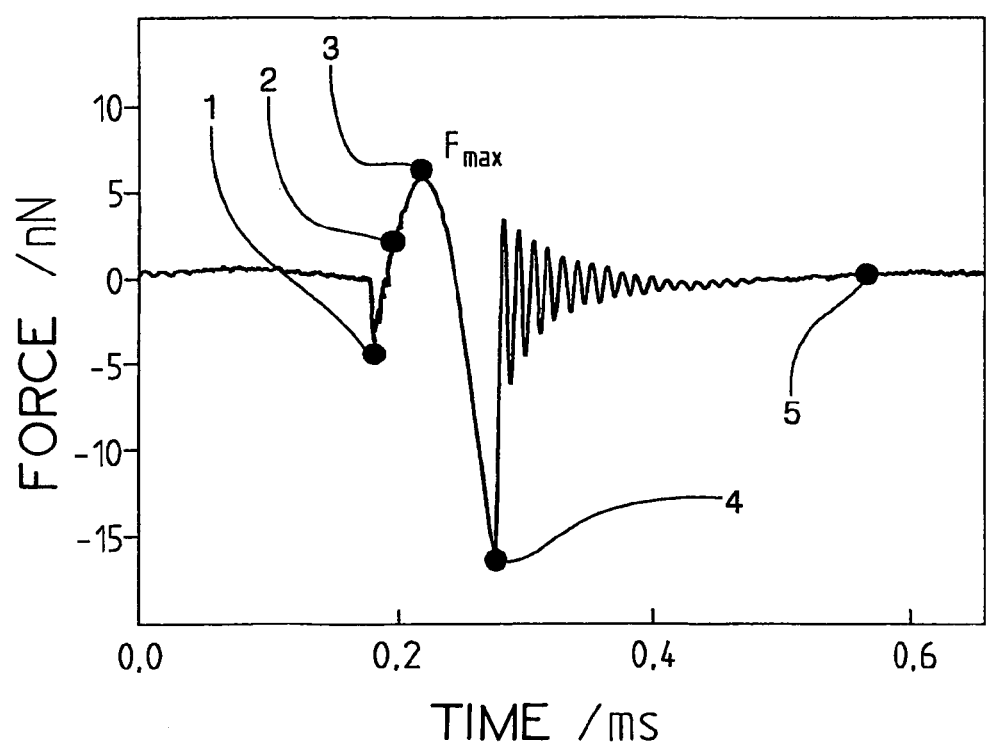
FIG. 1 shows a characteristic curve of a force-time curve.

FIG. 1 shows the characteristic progress of a force-time curve as obtained after passing through an oscillation period of a scanning probe, which in the present case is a probe tip arranged on a beam. The oscillation amplitude of the oscillation of the scanning probe tip as excited by means of a piezoelectric element lies between 10 and 500 nm and the oscillation frequency between 1 Hz and 5 kHz, and in the present case in the region of 1 kHz.

FIG. 1 clearly shows the characteristic regions of the force-time curve which arises., when excited, perpendicular to the specimen surface. Said regions can be used for determining the characteristic variables and, when applied to the scanned region, lead to the different forms of image of the specimen surface.

The function as illustrated in FIG. 1 is already standardized on the base or zero line, which means that the force value of the base line of the scanning probe is set to zero. The base line can be determined in such a way that the region of the force-time curve is determined in which the force value no longer changes. This value, which is provided with the reference numeral 5 in this case, is set to zero. Relative to this, one determines the other force values of the curve.

The scanning probe is moved towards the specimen surface at first. After approximately 0.2 milliseconds the probe comes into contact with the specimen due to the negative attractive forces between scanning probe and specimen. Once the tip is in contact with the specimen, force is continued to be exerted by the piezoelectric element on the scanning probe or the tip and the tip is thus driven into the specimen or specimen surface. The repelling repulsive forces increase strongly and reach a maximum at point 3. After a preset path or a preset maximum force value $F_{max}$, the scanning probe is no longer driven into the specimen but pulled back by the piezoelectric element from the specimen. Due to the adhesive forces, it comes out of contact with the specimen only after reaching the force minimum at point 4 and passes over into a free oscillation. The free oscillation decays until the base line 5 is reached.

The cycle is then repeated again.

The progress of the force-time curve is principally the same for all specimens which are examined with the help of the "pulsed-force microscopy". However, it is possible to determine characteristic variables from the curve for the respective specimen or for the respective point of the probe, which variables, when composed, lead to an image of the specimen surface depending on the various physical parameters.

As a result, the difference between point 2 in the ascending branch of the force-time curve and the maximum force is a quantifiable measure for the local stiffness of the specimen. When this characteristic variable is evaluated from the recorded force-time curve according to the invention, one can thus obtain a local stiffness image of the specimen.

The minimum attractive force value 4 when detaching the tip from the specimen surface is again a quantifiable measure for the local adhesion of the specimen and offers an adhesion image when applied to the scanned region.

The minimum force value when latching the scanning probe onto the specimen surface in point 1 is a quantifiable measure to the local attraction of the specimen and leads to an attraction image of the surface when applied to the scanned region. From the rise times from the start of the contact until the maximum force and the fall time from the maximum force until reaching the zero crossing lead to rise and fall time images of the specimen surface.

The invention also allows evaluating integral variables. As a result, the integral under the force-time curve can be determined in the region of the repulsive contact and the integral under the force-time curve from the start of the contact until reaching the maximum force in point 3. If these two integral values are deducted from each other, one obtains a quantifiable statement on the work dissipated in the specimen.

Figure 2:
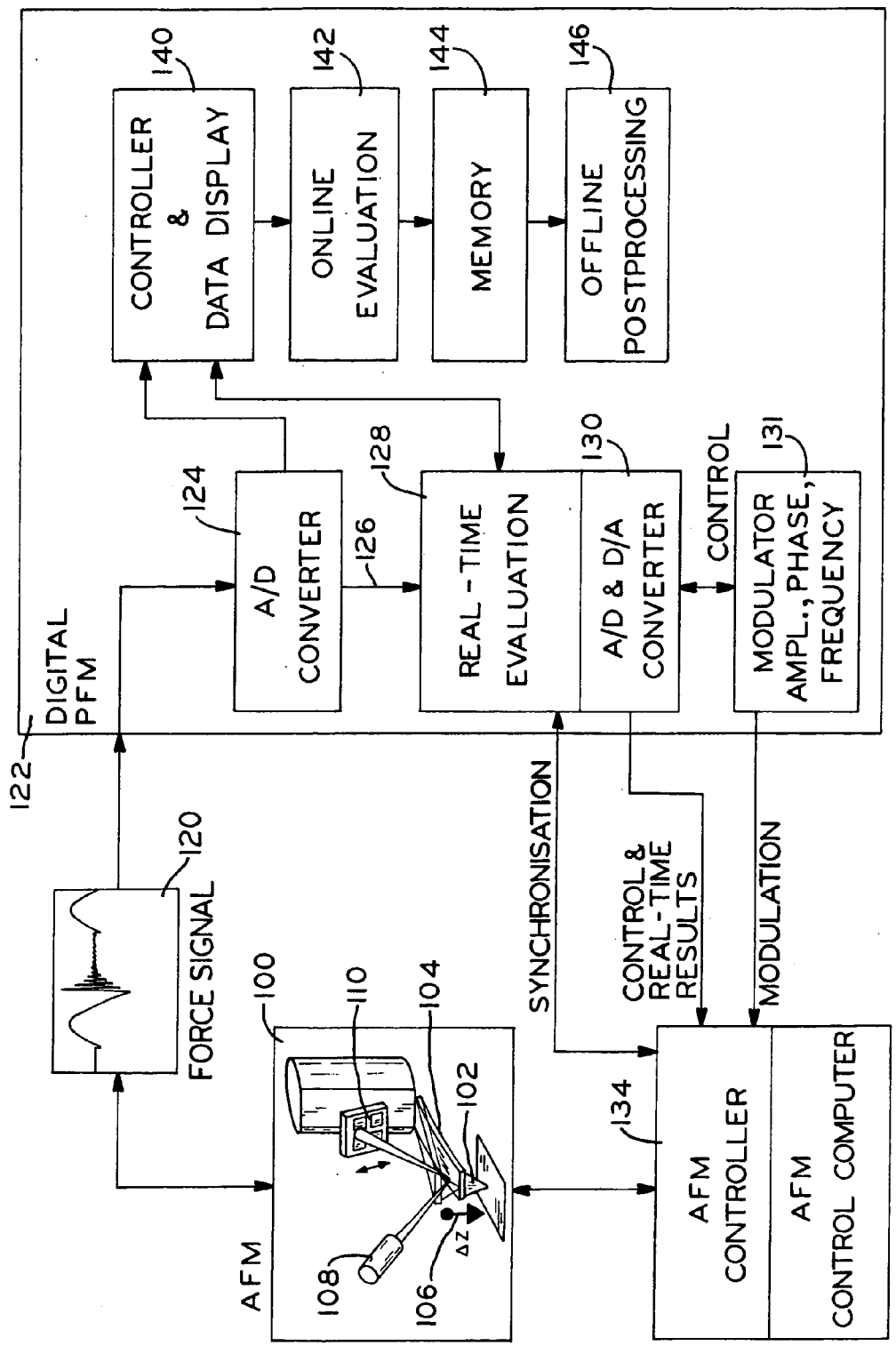
FIG. 2 shows a block diagram of a scanning probe microscope in accordance with the invention.

FIG. 2 shows by way of an example a block diagram of the configuration of a scanning probe microscope in accordance with the invention which is operated in "pulsed force mode". The scanning probe microscope is designated with reference numeral 100. The scanning probe microscope comprises a scanning probe 102 which is usually a tip. The scanning probe is suspended on a beam 104. The scanning probe is made to oscillate in the z direction 106, i.e. in the perpendicular direction relative to the specimen surface. The deflection of the beam 104 on which the tip 102 is arranged is evaluated by a beam which is emitted by a laser diode 108 and is detected by a four-quadrant detector 110. The analog force measurement signal which is obtained by the deflection of the beam 104 which is also designated as cantilever is provided with reference numeral 120. The analog force signal 120 is supplied to a control unit 122 according to the invention. The control unit 122 comprises an analog-to-digital converter 124 which converts the analog data of the force signal 120 into a digital data stream 126. The digital data stream is evaluated by means of a realtime evaluating unit 128 in realtime by means of programmable logic unit for example. Realtime shall be understood in such a way that the result of the evaluation is obtained in a guaranteed fashion within a fixedly predetermined interval, i.e. in this case not later than until the end of the current modulation cycle, so that the result can be used as an actual value for a controller. The programmable logic unit can be realized by "field programmable gate arrays" (so-called FPGAs) for example. Such programmable logic units have been described for example in Ashok K. Sharma: "Programmable Logic Handbook: PLDs, CPLDs and FPGAs (McGraw-Hill Professional Publishing; ISBN: 0070578524)" or in "W. Bolton, Bill Bolton: Programmable Logic Controllers: An Introduction (Butterworth-Heinemann; ISBN: 0750647469)".

With the help of realtime evaluation 128 it is possible, once the evaluated digital signal had been converted back into an analog signal again in the digital-to-analog converter 130, to use for controlling purposes the constant maximum force (by taking into account interferences or measuring artifacts caused by far-reaching forces), the constant energy introduction, constant penetration depth, etc., or combinations of such variables.

An external analog signal such as a set-point value predetermined by the AFM controller can also be included by the analog-to-digital converter 130 in the calculation of the actual value for the controller. The control variables are sent by the controller of the scanning probe microscope 134 to the scanning probe microscope 100 for tracking the tip 102 on the beam 104.

It is the task of the modulator 131 to produce the vertical oscillation of the measuring tip which is necessary for "pulsed force mode". The digital configuration allows using any desired shape of curve for the modulation. By providing a close linkage to the aforementioned realtime evaluation, it is possible to have an influence which is automatically controlled by control parameters on phase, amplitude and frequency of the modulation in addition to an interactive intervention by the user. This allows the correction of piezoelectric non-linearities of the scanning probe microscope.

In addition to realtime control or tracking of the scanning probe 104, the realtime evaluation with the help of the module 128 also allows the synchronous evaluation of characteristic data in the module 140 and thus an online check or evaluation 142 of the measurement. Furthermore, a memory area 144 can be provided to which the digital data stream can be saved. The data stream 144 saved to the memory can be executed offline in a post-processing process 146 after the measurement has been completed.

The invention thus provides a method and an apparatus for the first time for performing a method which allows precisely determining a large number of variables which are characteristic for a specimen by means of a single measurement and obtaining therefrom the imaging of different physical surface properties.

The invention claimed is:

1. A scanning probe microscope for producing an image of a surface of a specimen, comprising:
   a scanning probe;
   means for displacing the scanning probe laterally and perpendicularly relative to the specimen surface;
   means for exciting a periodic movement of the scanning probe perpendicular to the sample surface at predetermined scanning points, so that the distance (Z) between the specimen surface and scanning probe is modulated periodically;
   means for recording a force-time curve of the scanning probe which is periodically modulated perpendicularly to the specimen surface;
   an analog-to-digital converter device for digitizing the recorded force-time curve;
   means for determining predetermined characteristic variables at each scanning point from the digitized force-time curve for the respective scanning point; and
   a programmed logic unit in the form of Field Programmable Gate Arrays (FPGA) that receives the digitized force-time curve.

2. The scanning probe microscope according to claim 1, wherein a digitized data flow of the force-time curve is connected to the programmed logic unit.

3. The scanning probe microscope according to claim 1, wherein the scanning probe comprises a tip disposed on a beam and the means for recording the force-time curve comprises means for measuring the beam deflection.

4. The scanning probe microscope according to claim 1, wherein the means for periodic exciting comprises a piezoelectric element.

5. The scanning probe microscope according to claim 1, comprising means for tracking the scanning probe with the help of variables provided by the programmed logic unit as a control signal.

6. The scanning probe microscope according to claim 5, wherein the scanning probe comprises a tip disposed on a beam and the means for recording the force-time curve comprises means for measuring the beam deflection.

7. The scanning probe microscope according to claim 5, wherein the means for periodic exciting comprises a piezoelectric element.

8. The scanning probe microscope according to claim 7, wherein the scanning probe comprises a tip disposed on a beam and the means for recording the force-time curve comprises means for measuring the beam deflection.

9. A method for producing the image of a surface of a specimen to be examined with a resolution that is better than 1 µm laterally to the surface and better than 100 nm perpendicularly to the surface, comprising:
   scanning the surface point by point by means of a scanning probe;
   modulating the distance between the scanning probe and the specimen surface at each scanning point, thus leading to a force-time curve for the respective point;
   digitizing the received force-time curve by means of an analog-to-digital converter and evaluating the arising data stream in real time using an evaluation unit, which comprises a programmed logic unit in the form of Field Programmable Gate Arrays (FPGA);
   wherein one or several characteristic variables of the force-time curve are determined for each scanning point in real time from the digitized force-time curve which is evaluated in real time; and
   obtaining an image of the specimen surface and/or control variables for the measuring progress from said characteristic variable(s) of the scanning points.

10. The method according to claim 9, wherein variables for control parameters of the scanning probe are determined from the data stream evaluated in real time, said variables being made available to controller(s) of the scanning probe in real time.

11. The method according to claim 10, wherein the one or more characteristic variables comprises one or more of the following variables:
    the force value that is obtained when the scanning probe is close to the specimen surface, but is not yet in contact with the same;
    the maximum repulsive force value that is obtained while the scanning probe is in contact with the specimen surface;
    the difference between a value in the rising or falling region of the force-time curve and the maximum value of the force-time curve;
    the minimum attractive force value that is obtained when detaching the scanning probe from the specimen surface;
    the minimum force value when moving the scanning probe towards the specimen surface;
    the rise of the force-time curve at a certain time when pressing the tip into the specimen surface;
    the rise of the force-time curve at a certain time when pulling the tip away from the specimen surface;

the frequency of the cantilever from the force-time curve in the period of the free oscillation of the cantilever;

the ratio between the minimum force value and the subsequent local maximum force value;

the rise time from the start of the contact of the scanning probe with the specimen surface until the maximum force is reached;

the fall time from the time of the maximum force until the zero crossing is reached in the force-time curve;

the time of the repulsive contact between specimen and scanning probe;

the time of the contact between the scanning probe and the specimen surface;

the time from when the minimum force is reached until the subsequent zero crossing of the force-time curve;

the integral under the force-time curve in the region of the repulsive contact; the integral under the force-time curve from the start of the contact until the maximum force is reached;

the integral under the force-time curve from the zero point when the maximum force is reached until the zero crossing of the force;

the integral under the force-time curve from the time when the minimum force is reached until the zero crossing of the force;

the difference of the integral under the force-time curve in the region of the repulsive contact and the integral under the force-time curve from the start of the contact until the maximum force is reached;

the integral under the force-time curve in the region of the adhesive contact;

the integral under the force-time curve from the time of the zero crossing of the force until the minimum force is reached;

the integral under the force-time curve from the time of the minimum force until the zero crossing of the force.

12. The method according to claim 9, wherein the one or more characteristic variables comprises one or more of the following variables:

the force value that is obtained when the scanning probe is close to the specimen surface, but is not yet in contact with the same;

the maximum repulsive force value that is obtained while the scanning probe is in contact with the specimen surface;

the difference between a value in the rising or falling region of the force-time curve and the maximum value of the force-time curve;

the minimum attractive force value that is obtained when detaching the scanning probe from the specimen surface;

the minimum force value when moving the scanning probe towards the specimen surface;

the rise of the force-time curve at a certain time when pressing the tip into the specimen surface;

the rise of the force-time curve at a certain time when pulling the tip away from the specimen surface;

the frequency of the cantilever from the force-time curve in the period of the free oscillation of the cantilever;

the ratio between the minimum force value and the subsequent local maximum force value;

the rise time from the start of the contact of the scanning probe with the specimen surface until the maximum force is reached;

the fall time from the time of the maximum force until the zero crossing is reached in the force-time curve;

the time of the repulsive contact between specimen and scanning probe;

the time of the contact between the scanning probe and the specimen surface;

the time from when the minimum force is reached until the subsequent zero crossing of the force-time curve;

the integral under the force-time curve in the region of the repulsive contact; the integral under the force-time curve from the start of the contact until the maximum force is reached;

the integral under the force-time curve from the zero point when the maximum force is reached until the zero crossing of the force;

the integral under the force-time curve from the time when the minimum force is reached until the zero crossing of the force;

the difference of the integral under the force-time curve in the region of the repulsive contact and the integral under the force-time curve from the start of the contact until the maximum force is reached;

the integral under the force-time curve in the region of the adhesive contact;

the integral under the force-time curve from the time of the zero crossing of the force until the minimum force is reached;

the integral under the force-time curve from the time of the minimum force until the zero crossing of the force.

* * * * *